United States Patent [19]

Iwasaki et al.

[11] Patent Number: 5,001,321
[45] Date of Patent: Mar. 19, 1991

[54] WIRE ELECTRODE SUPPLYING DEVICE FOR USE IN A WIRE CUT ELECTRIC DISCHARGE MACHINING APPARATUS

[75] Inventors: Takeshi Iwasaki; Takuji Magara; Toshio Suzuki; Masahiro Yamamoto, all of Aichi, Japan

[73] Assignee: Mitsubishi Denki Kabushiki Kaisha, Tokyo, Japan

[21] Appl. No.: 390,846

[22] Filed: Aug. 8, 1989

[30] Foreign Application Priority Data

Aug. 16, 1988 [JP] Japan .................. 63-203442

[51] Int. Cl.⁵ .............................................. B23H 7/10
[52] U.S. Cl. .................................................. 219/69.12
[58] Field of Search ............... 219/69.12, 69.14, 69.17, 219/69.15

[56] References Cited

U.S. PATENT DOCUMENTS

| | | | |
|---|---|---|---|
| 4,412,118 | 10/1983 | Nomura et al. | 219/69.12 |
| 4,530,471 | 7/1985 | Inoue | 219/69.12 |
| 4,814,572 | 3/1989 | Aso et al. | 219/69.12 |

FOREIGN PATENT DOCUMENTS

| | | | |
|---|---|---|---|
| 55-46806 | 11/1980 | Japan . | |
| 56-10130 | 3/1981 | Japan . | |
| 119327 | 9/1981 | Japan | 219/69.17 |
| 149126 | 9/1982 | Japan | 219/69.12 |
| 63-41697 | 8/1988 | Japan . | |
| 283825 | 11/1988 | Japan | 219/69.14 |
| 64-27819 | 1/1989 | Japan | 219/69.15 |

*Primary Examiner*—A. D. Pellinen
*Assistant Examiner*—Geoffrey S. Evans
*Attorney, Agent, or Firm*—Sughrue, Mion, Zinn, Macpeak & Seas

[57] ABSTRACT

A detecting unit for detecting when the wire electrode is released from a jet stream of a machining solution during the feeding of the wire electrode. Upon detection of the release of the wire electrode, the feeding of the wire electrode is suspended automatically to remove the deformed wire electrode.

4 Claims, 4 Drawing Sheets

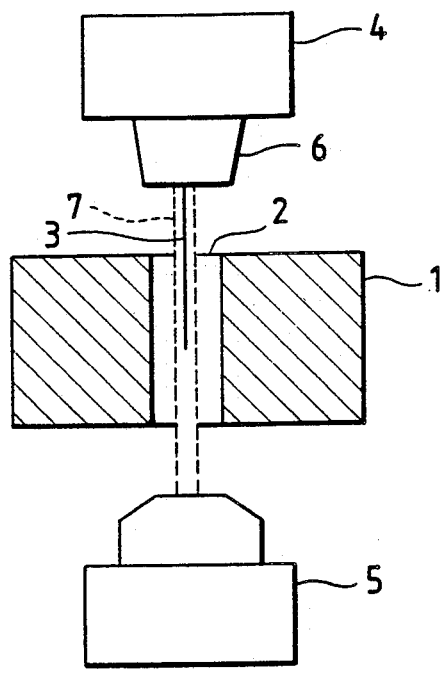
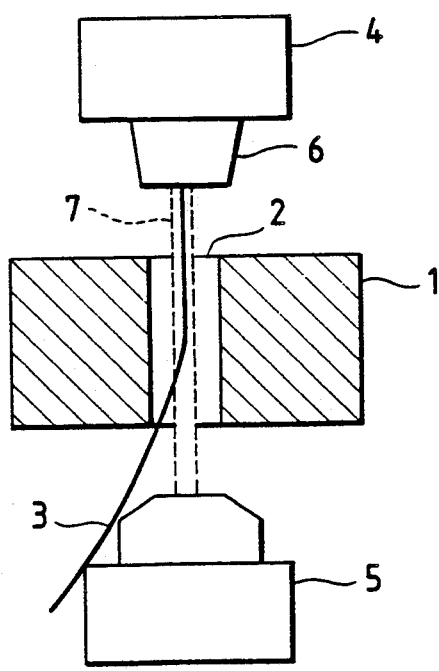
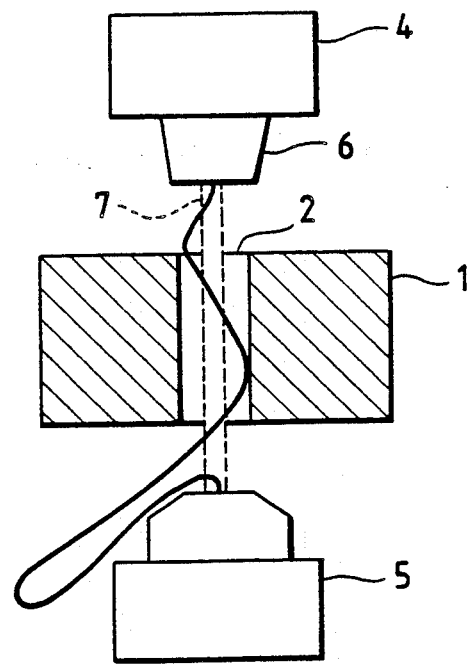

WIRE ELECTRODE SUPPLYING DEVICE FOR USE IN A WIRE CUT ELECTRIC DISCHARGE MACHINING APPARATUS

BACKGROUND OF THE INVENTION

The present invention relates to a wire electrode supplying device for use in a wire cut electric discharge machining apparatus.

FIG. 1 shows a conventional wire electrode supplying device disclosed, for instance, by Published Examined Japanese Patent Application No. 11111/1985. In such a device, while being restrained with a jet stream of machining solution (hereinafter referred to as "a jet stream", when applicable) a wire electrode is conveyed by a wire electrode feeding unit (not shown) from a wire guide member on the wire electrode supplying side to a wire guide member on the wire electrode receiving side which are provided on both sides of a workpiece to be machined.

In FIG. 1, reference numeral 1 designates a workpiece; 2, a machining start hole; 3, a wire electrode; 4, a wire guide on the wire electrode supplying side; 5, a wire guide on the wire electrode receiving side, 6, a jet nozzle; and 7, a jet stream.

In automatically supplying the wire electrode with the wire electrode supplying device thus constructed, the jet stream 7 is jetted from the wire guide 4 on the wire electrode supplying side, and under this condition, the wire electrode is passed through the machining start hole 2 and the wire guide 5 on the wire electrode receiving side by means of a wire electrode supplying mechanism (not shown) while being restrained by the jet stream, and is then taken up by a wire take-up mechanism (not shown) or received in a predetermined container Thus, the wire cut electric discharge machining operation can be started.

The conventional wire electrode supplying device in a wire cut electric discharge machining apparatus machine is designed as described above. Therefore, when the wire electrode comes out of the jet stream without being restrained, it becomes impossible to supply the wire electrode. FIGS. 2(a) and 2(b) are explanatory FIGURES for describing the difficulty that the wire electrode comes out of the jet stream during the wire electrode supplying operation. In FIGS. 2(a) and 2(b), those components which have been previously described with reference to FIG. 1 are therefore similarly numbered. FIG. 2(a) shows the case when the end portion of the wire electrodes comes out of the jet stream before reaching the wire guide 5 on the wire electrode receiving side. In this case, the wire electrode is not inserted into the wire guide 5, and therefore the wire electrode supplying operation must be stopped This difficulty is liable to occur especially when the wire electrode remains greatly curled.

In general, a wire electrode is wound on a wire electrode supplying bobbin before use, and therefore it remains curled to some extent. In addition, the wire electrode is curled when drawn. Furthermore, usually in the wire cut electric discharge machining apparatus pulleys and rollers are provided along the wire electrode laying path from the wire electrode supplying bobbin to the wire guide on the wire electrode receiving side, and therefore the wire electrode is additionally curled while being conveyed along the wire electrode laying path. That is, there are many causes to curl the wire electrode. Thus, the curvature and direction of curl of the wire electrode are variously changed while it is conveyed along the wire electrode supplying path.

On the other hand, the jet stream acts to make the curled wire electrode straight, and to restrain it so that it is positioned along, the central, axis of the jet stream. This restraining force is attributed to the shearing force of the fluid. The velocity of the jet stream is higher than the wire electrode supplying speed. Therefore, a fluid shearing force acts uniformly on the minute parts of the wire electrode in the wire supplying direction, and, on a point of the wire electrode, a force proportional to the distance between the point and the end of the wire electrode is exerted, thus pulling the wire electrode on the wire electrode supplying side. As a result, the curled wire electrode is made straight, and it is held at the center of the jet stream. However, it goes without saying that the restraining force of the jet stream exerted on the wire electrode is limited. According to the experiment of the present inventor, in the case where a 0.3 mm diameter brass wire is conveyed with a jet stream 1.5 mm in diameter and 5 kg f/cm$^2$ in pressure, the wire electrode curled with a curvature radius (p) of at least 200 mm as shown in FIG. 3 is positively restrained by the jet stream, but a wire electrode curled with a curvature radius of less than 200 mm is not restrained by the jet stream, thus coming out of the latter. In the case of FIG. 2(a), after the end portion of the wire electrode has passed through the wire guide on the wire electrode receiving side, a load is developed at the wire guide to obstruct the insertion of the wire electrode, so that the wire electrode being supplied has no way to go, thus coming out of the jet stream. In this case also, the conveyance of the wire electrode must be suspended.

That is, in the conventional wire electrode supplying device, when the wire electrode is greatly curled, or when a load to obstruct the insertion of the wire electrode is developed at the wire guide on the wire electrode receiving side, the wire electrode is not restrained by the jet stream, thus coming out of the latter, as a result of which the wire electrode supplying operation must be suspended.

SUMMARY OF THE INVENTION

In view of the above, an object of the present invention is to eliminate drawbacks accompanying the prior art device, and the object is accomplished by the provision of a wire electrode supplying device for use in a wire cut electric discharge machining apparatus comprising means for detecting when the wire electrode is released from the jet stream of machining solution, to come out of it.

BRIEF DESCRIPTION OF THE DRAWINGS

In the accompanying drawings:

FIG. 1 is an explanatory diagram showing a conventional wire electrode supplying device; FIGS. 2(a) and 2(b) are explanatory diagrams for a description of difficulties accompanying the conventional wire electrode supplying device.

DESCRIPTION OF PREFERRED EMBODIMENTS

Preferred embodiments of this invention will be described with reference to the accompanying drawings.

Figure 4:
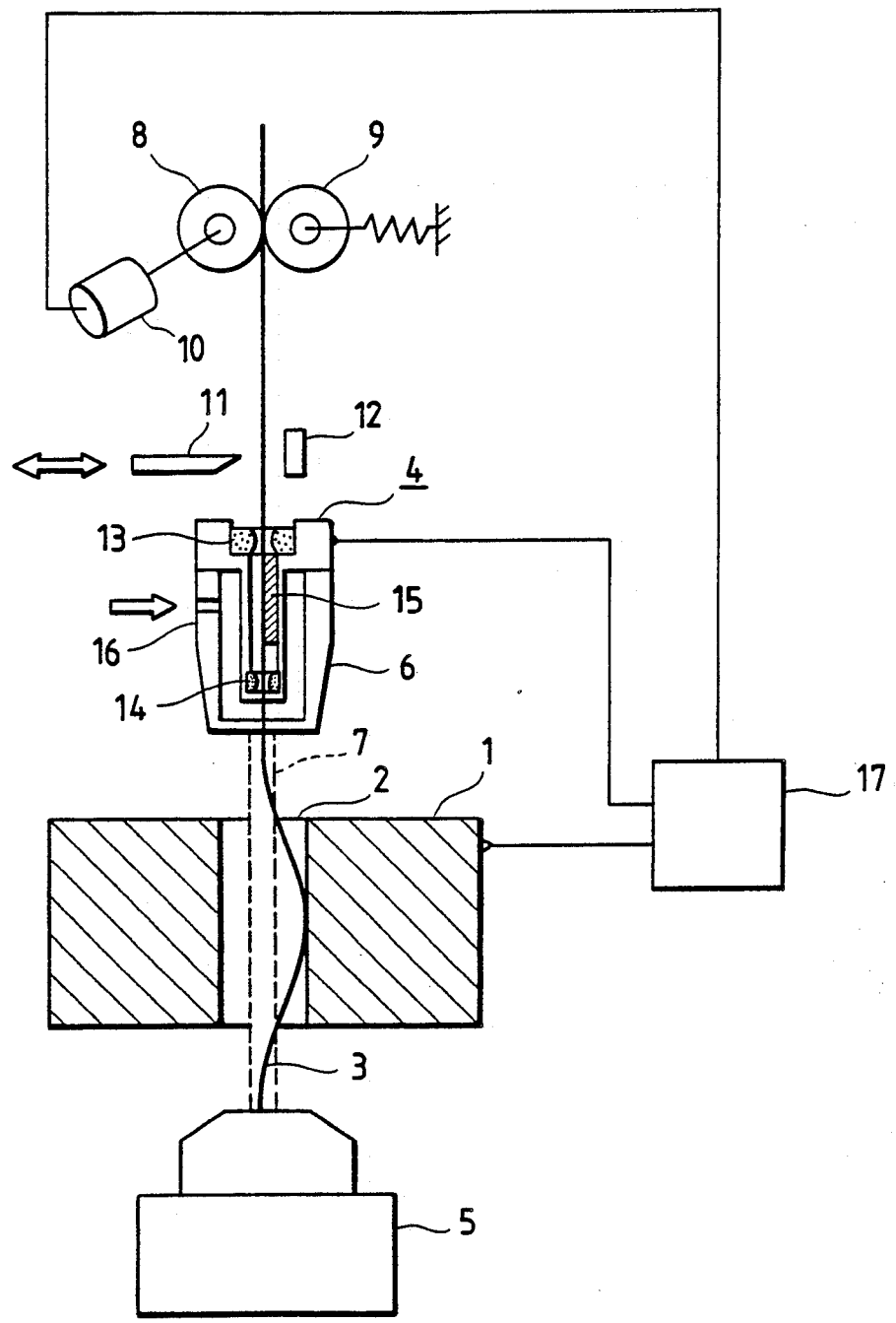
FIG. 4 is an explanatory diagram showing the arrangement of one example of a wire electrode supplying device for use in a wire cut electric discharge machining apparatus according to the present invention.

In FIG. 4, parts corresponding functionally to those already described with reference to FIG. 1 are therefore designated by the same reference numerals or characters.

Further in FIG. 4, reference numeral 8 designates a capstan roller; 9, a pinch roller; 10, a wire electrode supplying motor coupled to the capstan roller; 11, a cutter; 12, a cutter board, both 11 and 12 being mounted on a conventional wire electrode cutting mechanism which has been disclosed, for instance, in Published Unexamined Japanese Patent Application (OPI) No 80528/1985; 13, a guide die for guiding a wire electrode 3 to a wire guide 4 on the wire electrode supplying side (hereinafter referred to as "an upper wire guide 4", when applicable); and 14, a die guide for supporting the wire electrode, the die guide 14 being brazed to the upper wire guide 4. The upper wire guide 4 is cylindrical, and an electrical feeder 15 is built therein. The wire electrode 3 is supported along the central axis of the upper wire guide 4 on both sides of the electrical feeder 15 by the guide die 13 and the die guide 14, so that it is caused to rub the cut of the electrical feeder 15.

Figure 3:
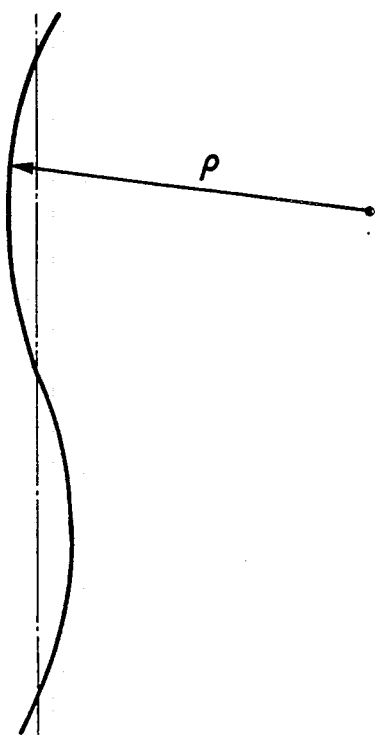
FIG. 3 an explanatory diagram for a description of the curl of a wire electrode.
Figure 5:
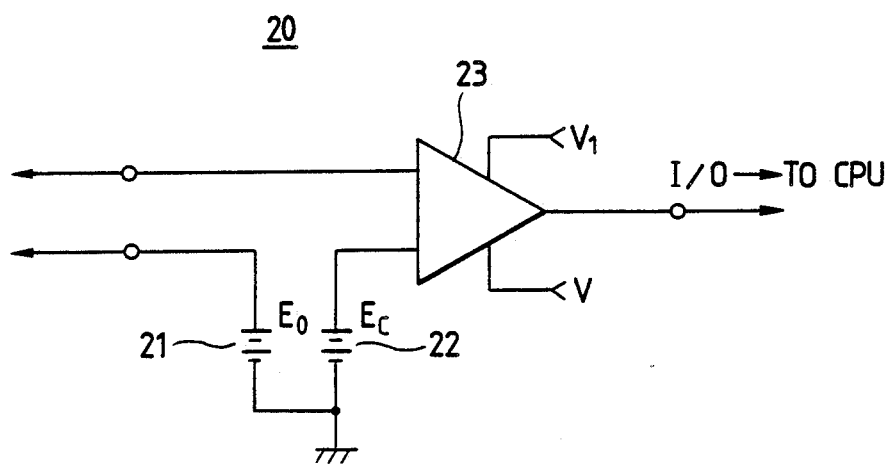
FIG. 5 is a circuit diagram showing a contact detecting circuit in the wire electrode supplying device in FIG. 4.

Further in FIG. 4, reference numeral 16 designates a fluid inlet formed in a jet nozzle 6; and 17, a numerical control device. The numerical control device 17, as shown in FIG. 5, includes a contact detecting circuit 20. One terminal of the circuit 20 is connected to the workpiece 1, and the other terminal is connected through the upper wire guide 4 and the electrical feeder 15 to the wire electrode 3. In the circuit, a comparator 23 compares an interelectrode voltage Eo from a DC source 21 which is applied across the workpiece 1 and the wire electrode 3 with a comparison voltage Ec from a comparison voltage source 22. When the wire electrode 3 is brought into contact with the workpiece so that the interelectrode voltage Eo becomes lower than the comparison voltage Ec, the comparator 23 outputs a contact detection signal, which is applied to the CPU in the numerical control device 17.

The operation of the embodiment shown in FIG. 4 will be described. It is assumed that before the wire electrode supplying operation starts, the cutter 11 has moved to the cutter board 12 by the wire electrode cutting mechanism (not shown); that is, the wire electrode has been cut with the cutter. Upon start of the wire electrode supplying operation, in response to a signal from the numerical control device 17 the wire supplying motor 10 is operated to rotate the capstan roller 8 and the pinch roller 9 to thereby feed the wire electrode 3. The wire electrode 3 is inserted into the guide die 13 and the wire guide 4, and then passed through the die guide 14 to the jet nozzle 6. The stream of machining solution 7 is jetted as follows: Simultaneously when the wire electrode supplying motor is operated, or in a delay time set by the numerical control device 17, a machining solution is supplied into the jet nozzle 6 through the fluid inlet 16 by a machining solution supplying device (not shown), thus forming the aforementioned jet stream. Thus, the wire electrode 3 is conveyed towards the lower wire guide 5 while being restrained by the jet stream.

Now, the operation carried out when the wire electrode is released from the jet stream, thus coming out of the latter will be described. Even if the wire electrode comes out of the jet stream, the wire electrode supplying motor is kept rotated. Therefore, the wire electrode is caused to go outside the lower wire guide 5, or it is bent in the machining start hole, thus contacting the workpiece. This contact is transmitted, as a signal, to the numerical control device 17, as a result of which the numerical control device suspends the rotation of the wire electrode supplying motor 10. Thereafter, the wire electrode 3 is cut by moving the cutter 11 to the cutter board 12 with the wire cutting mechanism, and its end portion thus cut off is removed. Thereafter, the wire electrode supplying operation is carried out all over again.

Thus, the curled portion of the wire electrode which causes the failure in the wire electrode supplying operation has been removed; that is, the recovery operation has been accomplished. Under this condition, the remaining wire electrode is supplied so that the wire electrode supplying operation is continued. The insertion of the wire electrode into the lower wire guide 5 is obstructed in the case where, when the wire electrode 3 is inserted, its slide resistance is increased with the curvature of the curled portion of the wire electrode, or the slide resistance is increased as the angle of approach of the wire electrode, having a degree of freedom, increases in probability. Therefore, in these cases also, the above-described recovery operation is carried out to continue the wire electrode supplying operation.

Figure 6A:
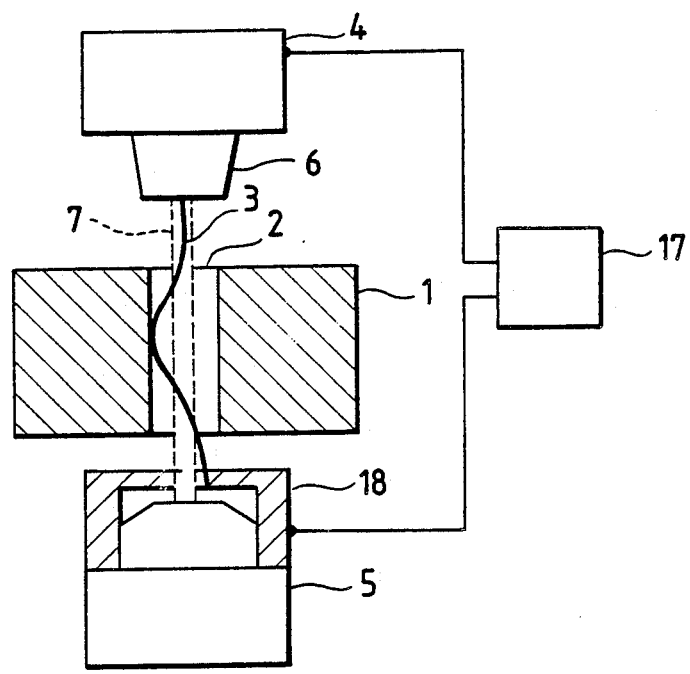
FIGS. 6(a) and 6(b) are explanatory diagrams showing other examples of the wire electrode supplying device according to the invention.
Figure 6B:
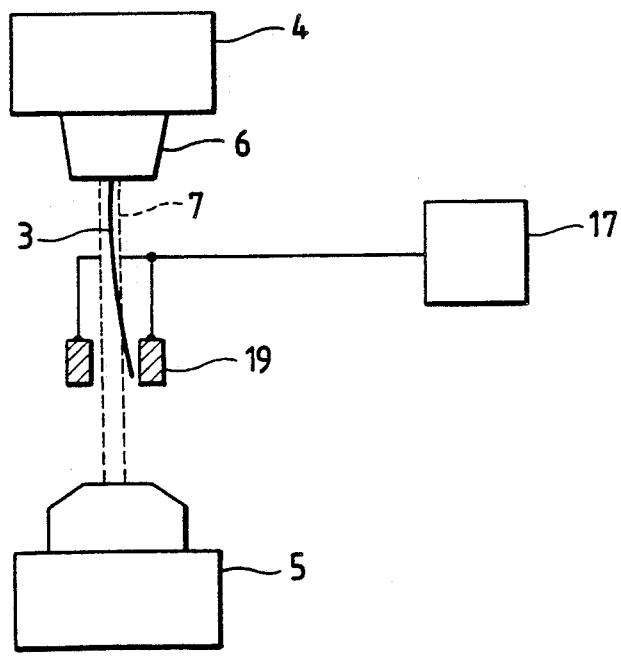

In the above-described wire electrode supplying device, means for detecting when the wire electrode comes out of the jet stream may be designed as shown in FIGS. 6(a) and 6(b). In the case of FIG. 6(a), a detecting electrode 18 is provided on the part of the lower wire guide 5 which is confronted with the workpiece, so as to detect the contact of the wire electrode with at least a part of a member of the lower wire guide 5. In the case of FIG. 6(b), sensors 19 such as optical sensors or proximity sensors are fixedly or movably provided near the jet stream, to detect when the wire electrode comes out of it.

As was described above, the wire electrode supplying device of the invention is so designed as to detect when the wire electrode is released from the jet stream of machining solution, to come out of it. Therefore, whenever the wire electrode comes out of the jet stream, the wire electrode supplying operation is suspended, and the recovery operation is carried out. Thus, the wire electrode supplying operation is positively carried out, and the unmanned operation of the wire cut electric discharge machine can be carried out with higher reliability.

WHAT IS CLAIMED IS:

1. A wire electrode supplying device for use in a wire cut electric discharge machining apparatus in which a wire electrode is conveyed by a wire electrode feeding means from a wire guide on a wire electrode supplying side to a wire guide on a wire electrode receiving side while being restrained by a jet stream of machining solution, comprising:
   means for detecting when said wire electrode is not restrained by said jet stream of machining solution; and
   means for terminating the operation of said wire electrode feeding means in response to an output of said detecting means.

2. The wire electrode supplying device as defined in claim 1 wherein said detecting means detects the release of said electrode from said jet stream by detecting the contact of said electrode with a workpiece to be machined.

3. The wire electrode supplying device as defined in claim 1 wherein said detecting means comprises a pair of optical sensors.

4. A wire electrode supplying device for use in a wire cut electric discharge machining apparatus in which a wire electrode is conveyed by a wire electrode feeding means from a wire guide on a wire electrode supplying side to a wire guide on a wire electrode receiving side while being restrained by a jet stream of machining solution, said device comprising:

means for detecting when said wire electrode is released from said jet stream of machining solution; and means for controlling the operation of said wire electrode feeding means in response to an output of said detecting means wherein said detecting means detects the release of said electrode from said jet stream by detecting the contact of said electrode with the wire guide on the wire electrode receiving side.

* * * * *